(12) United States Patent
Stellmann et al.

(10) Patent No.: US 8,474,356 B2
(45) Date of Patent: Jul. 2, 2013

(54) MACHINE TOOL MONITORING DEVICE

(75) Inventors: Georg Stellmann, Ludwigsburg (DE); Sebastian Jackisch, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 12/664,596

(22) PCT Filed: Apr. 15, 2008

(86) PCT No.: PCT/EP2008/054555
§ 371 (c)(1),
(2), (4) Date: May 7, 2010

(87) PCT Pub. No.: WO2008/151872
PCT Pub. Date: Dec. 18, 2008

(65) Prior Publication Data
US 2010/0212466 A1 Aug. 26, 2010

(30) Foreign Application Priority Data

Jun. 15, 2007 (DE) .......................... 10 2007 027 669
Jan. 9, 2008 (DE) .......................... 10 2008 003 585

(51) Int. Cl.
*B23Q 5/58* (2006.01)
*G01J 3/28* (2006.01)
(52) U.S. Cl.
USPC ................. 83/63; 83/62.1; 83/58; 83/DIG. 1; 83/477.2; 83/365; 250/339.07
(58) Field of Classification Search
USPC .................. 83/58, 62.1, 561, 47, 63, 74, 469, 83/788, DIG. 1, 477.2, 477.1, 490, 589, 471.3, 397.1, 297, 365, 471.2, 644; 144/382, 427; 173/1; 700/21, 171, 108; 702/65; 340/686.5, 340/411; 307/117; 241/37.5; 356/445; 424/9.5, 424/9.6; 250/342, 339.07, 388.1; 361/181, 361/281, 286, 176; 320/166, 262, 658, 663, 320/665–668, 675, 686, 688, 689
See application file for complete search history.

(56) References Cited

U.S. PATENT DOCUMENTS

| 4,710,629 A * | 12/1987 | Muller et al. ................. 250/342 |
| 7,615,736 B2 * | 11/2009 | Horimoto et al. ........ 250/227.28 |
| 2005/0010960 A1 | 1/2005 | Kitazawa et al. |
| 2006/0101960 A1 * | 5/2006 | Smith et al. ...................... 83/58 |
| 2008/0185525 A1 * | 8/2008 | Lyubchik et al. ............. 250/342 |
| 2010/0037739 A1 * | 2/2010 | Anderson et al. ................ 83/58 |

FOREIGN PATENT DOCUMENTS

| CN | 1500604 | 6/2004 |
| DE | 10 2007 039 5 | 3/2008 |
| EP | 1 422 022 | 5/2004 |
| GB | 22 07 999 | 2/1989 |

* cited by examiner

*Primary Examiner* — Ghassem Alie
(74) *Attorney, Agent, or Firm* — Kenyon & Kenyon LLP

(57) ABSTRACT

A machine tool monitoring device having a detection unit, which is configured to detect the presence of a material type in a machine tool work area by spectral analysis of a radiation. The detection unit has a sensor unit having at least one sensitivity region for detecting radiation in a wavelength range that is situated at least partially in the infrared spectrum.

10 Claims, 5 Drawing Sheets

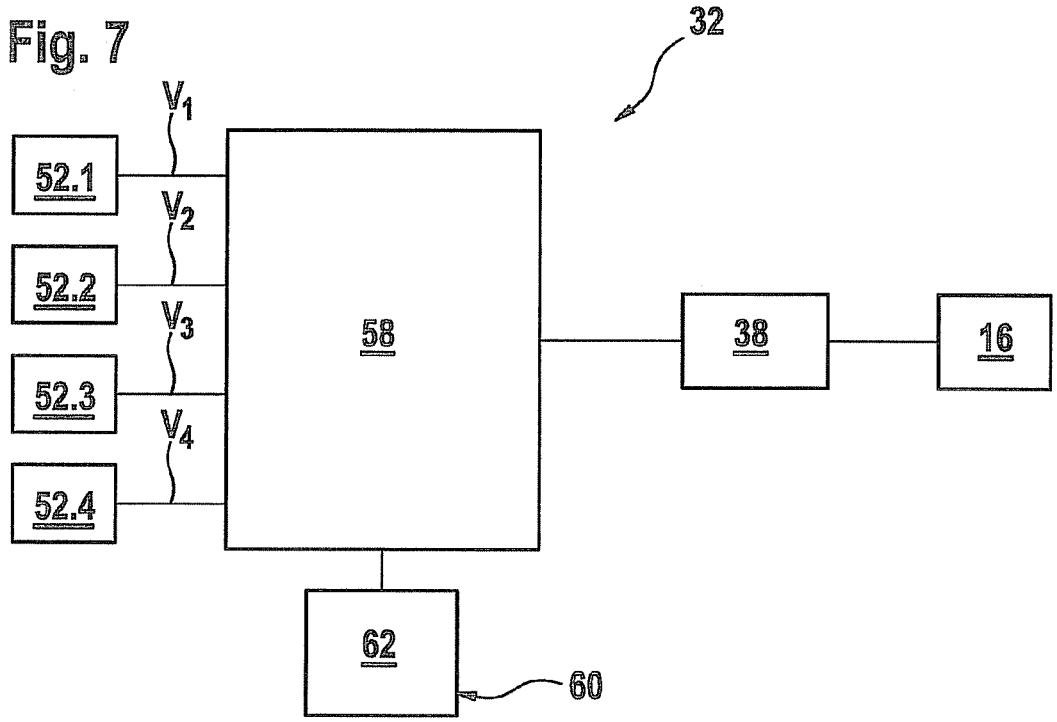

MACHINE TOOL MONITORING DEVICE

FIELD OF THE INVENTION

The present invention relates to a machine tool monitoring device.

BACKGROUND INFORMATION

There are machine tool monitoring devices having a detection unit for detecting a material.

SUMMARY OF THE INVENTION

The exemplary embodiments and/or exemplary methods of the present invention relates to a machine tool monitoring device having a detection unit, which is configured to detect the presence of a material type in a machine tool work area by spectral analysis of a radiation.

The exemplary embodiments and/or exemplary methods of the present invention provides for the detection unit to have a sensor unit having at least one sensitivity region for detecting radiation in a wavelength range that is situated at least partially in the infrared spectrum.

This makes it possible to achieve a reliable and quick detection of an application situation in a machine tool in a cost-effective manner.

A "machine tool work area" is to be understood in particular as a area of a machine tool in the direct surroundings of a tool. An area in the "direct" surroundings of the tool is to be understood in particular as an area in which every point of the area has a smallest distance from the tool that amounts to maximally 10 cm, which may be maximally 5 cm and particularly which may be maximally 2 cm.

In this context, a "radiation" is to be understood in particular as an electromagnetic radiation. A "spectrum" of a radiation detected by the sensor unit is to be understood in particular as a distribution of a characteristic quantity of radiation, in particular of the intensity of the radiation as a function of the wavelength, the frequency and/or time. Furthermore, a "spectral analysis" of a radiation is to be understood in particular as a signal analysis, in which an analysis result is obtained by detecting a characteristic of a spectrum of the radiation. To achieve a quick analysis, a characteristic of the spectrum is equivalent in particular to a signal intensity integrated over a wavelength range.

To achieve a high degree of safety in the use of a machine tool, the detection unit may have an analysis arrangement for analyzing a radiation detected by the sensor unit, which is designed to detect, on the basis of the radiation, the presence of human tissue in the machine tool work area.

An exemplary embodiment of the present invention provides for the detection unit to be designed to detect the presence by analyzing a reflection spectrum of a radiation reflected on an object of investigation, whereby an effective detection of the material type may be achieved based on a detection of contrast.

A particularly reliable detection may be achieved if the wavelength range is a near-medium infrared range. A sensitivity region may thus be provided that is specifically adapted for detecting and analyzing a reflection spectrum. In this context, a "near-medium infrared range" is to be understood in particular as a wavelength interval of the infrared spectrum that is situated below the wavelength of 15 µm. Furthermore, a high contrast between human tissue and the material may be achieved if the sensitivity region for detecting a radiation is provided in a wavelength interval of the infrared spectrum below the wavelength of 8 µm. It is particularly advantageous if the wavelength range is a near infrared range. In this context, a "near infrared range" is to be understood in particular as a wavelength interval of the infrared spectrum that is situated below the wavelength of 1.5 µm such as in particular a wavelength interval in the IR-A range. The wavelength range may furthermore be situated partially in the visible range of the electromagnetic spectrum.

An analysis signal of a high signal intensity may be achieved if the detection unit has a transmitting unit that is designed to transmit a radiation having at least a radiation component in the wavelength range.

Another development of the exemplary embodiments and/or exemplary methods of the present invention provides for the transmitting unit to be designed to transmit a radiation successively in the wavelength range and in at least one additional wavelength range. This makes it possible to produce a radiation specifically in the desired wavelength ranges, it being possible to dispense with elaborate filtering when detecting the radiation with the aid of the sensor unit. Furthermore, a high signal/noise ratio may be achieved. This may be achieved in a particularly simple manner if the transmitting unit has at least two, in particular at least three sensor arrangement for transmitting the radiation respectively in a different wavelength range, which are operated successively in the operation of the transmitting unit. Furthermore, a "successive" transmission in two wavelength ranges is to be understood in particular in such a way that the transmission in the first wavelength range and the transmission in the second wavelength range are to the greatest possible extent free from overlap. For this purpose, an overlap duration, in which a radiation is transmitted simultaneously in both wavelength ranges, is to amount to less than 10%, advantageously less than 5% and which may be less than 1% of the shortest transmission duration in a wavelength range. Particularly advantageously, the transmission processes are free from overlap such that the transmitting unit emits pulses that are separated from one another.

Additionally, there is a provision for the machine tool monitoring device to have an optical unit designed to define a reaction area of the detection unit. A "reaction area" of the detection unit is to be understood in particular as a spatial area, which is associated with a process that the detection unit is able to execute, which is triggered in the event that a body of the material type is present in this spatial area. The reaction area may correspond at least to a subarea of the machine tool work area. Alternatively or additionally, a reaction area may be provided, which differs from the machine tool work area. This reaction area may be provided for a warning function of the machine tool monitoring device for example.

Advantageously, the detection unit is operatively connected to an actuator unit, the presence of the body of the material type in the reaction area triggering an operation of the actuator unit such as e.g. for stopping a machine tool drive unit. The optical unit may be equivalent to an optical system connected in the beam path of the sensor unit. If the machine tool monitoring device has a transmitting unit for transmitting a radiation, then the optical unit may alternatively or additionally be equivalent to an optical system connected in the beam path of the transmitting unit. The optical unit makes it possible to achieve a safe and comfortable use of a machine tool in that a reaction of the detection unit may be restricted to a delimited area.

Advantageously, the sensor unit has at least one additional sensitivity region, which is provided for detecting radiation in an additional wavelength range, whereby an even greater reliability in the detection of the material type may be achieved. The wavelength ranges may overlap. It is advantageous, however, if the wavelength ranges are separated from one another. A particularly precise detection may be achieved if the sensor unit has at least three sensitivity regions, which are respectively designed to detect radiation in a different wavelength range.

In this connection, a provision is made for the detection unit to have an analysis arrangement, which is designed to detect the presence of the material type on the basis of a ratio of at least two characteristic quantities of radiation, which are respectively associated with a radiation component in a different wavelength range. This advantageously makes it possible to achieve a quick detection. In particular, one may dispense with taking a reference radiation into account. A "characteristic quantity of radiation" is to be understood in particular as a characteristic quantity that is detected on the basis of a radiation striking the sensor unit. This characteristic quantity may be in particular an electrical characteristic quantity.

An exemplary embodiment of the present invention provides for the wavelength range to be configured in narrow-band fashion. In this context, a "narrow-band wavelength range" is to be understood in particular as a wavelength range, which has a bandwidth of maximally 100 nm, advantageously maximally 50 nm, which may be maximally 20 nm and particularly which may be maximally 10 nm. As a result, a filtering of a detected radiation involving an elaborate construction may be dispensed with advantageously.

Furthermore, the ease of operation may be increased advantageously if the machine tool monitoring device has a marking unit, which is designed to mark the reaction area.

Further advantages are derived from the following description of the drawing. The drawings shows exemplary embodiments of the present invention. The drawing, the specification and the claims include numerous features in combination. One skilled in the art will appropriately consider the features individually as well, and unite them to other useful combinations.

BRIEF DESCRIPTION OF THE DRAWINGS

FIG. 7 shows an internal circuit of the detection unit.

FIG. 8 shows a database stored in the detection unit.

DETAILED DESCRIPTION

Figure 1:
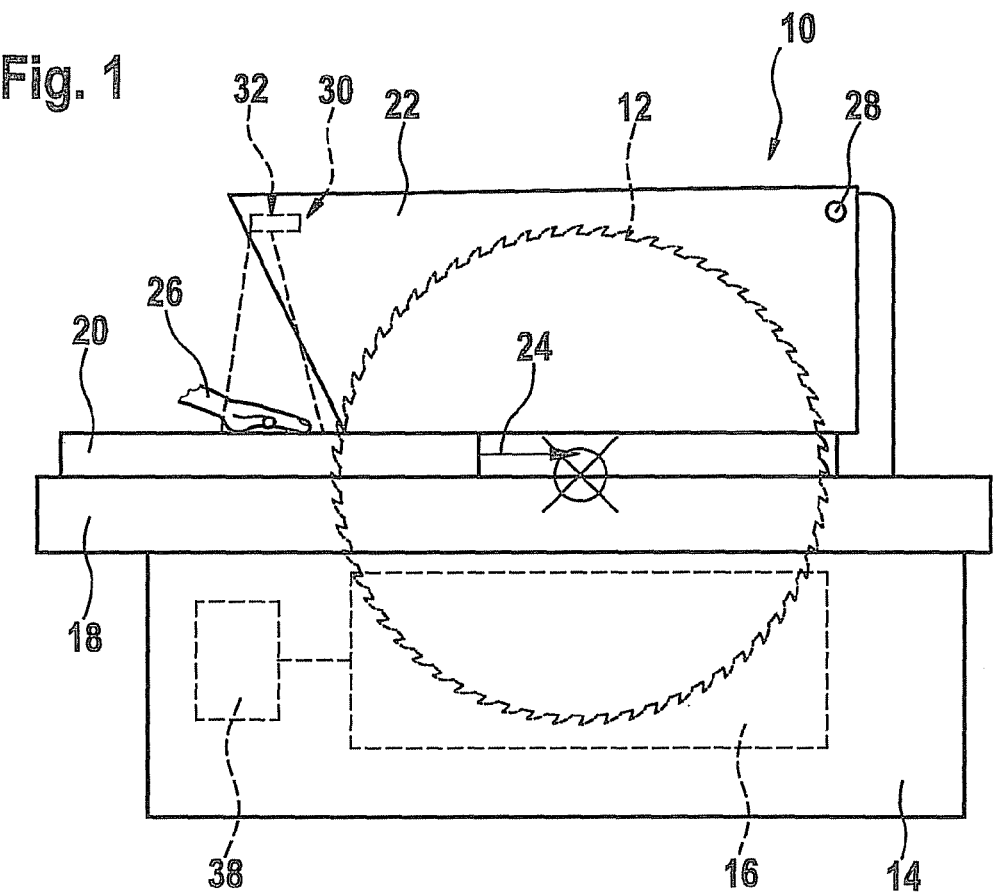
FIG. 1 shows a lateral view of a circular saw bench having a detection unit.

FIG. 1 shows a lateral view of a machine tool 10 in the form of a circular saw bench. Machine tool 10 has a tool 12 in the form of a disk-shaped saw blade, which in a sawing operation is driven rotationally by a drive unit 16 in the form of an electric motor situated in a drive housing 14. Drive housing 14 supports a saw bench 18, on which a workpiece 20 to be machined may be placed. For the protection of an operator, machine tool 10 comprises a protective hood 22, which in the inoperative state of machine tool 10 encloses the part of tool 12 projecting out of saw bench 18 entirely. In order to machine workpiece 20, the latter is moved in a known manner in a working direction 24 in the direction of tool 12 by an operator, whose one hand 26 is schematically represented in the figure. In the process, protective hood 22, which is supported so as to be rotatable about an axis of rotation 28, is swung upwards by workpiece 20, thereby exposing the cutting edge of the tool.

Figure 2:
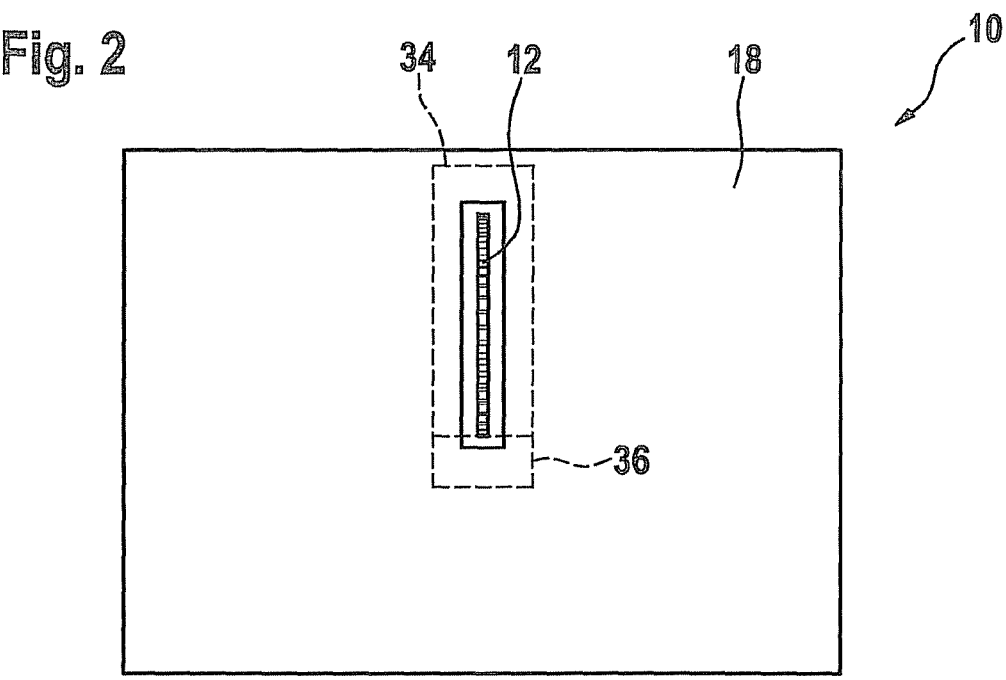
FIG. 2 shows the circular saw bench in a top view from above having a reaction area of the detection unit.

To increase the operator's safety, machine tool 10 is equipped with a machine tool monitoring device 30. Machine tool monitoring device 30 has a detection unit 32, which is designed to detect the presence of human tissue in a machine tool work area 34 of machine tool 10. FIG. 2 shows machine tool work area 34 in a top view of machine tool 10 from above. For the sake of clarity, the representation of protective hood 22 was omitted in FIG. 2. Detection unit 32 has a reaction area 36, which is associated with the operation of an actuator unit 38 coupled to drive unit 16, which actuator unit 38 is in operative connection with detection unit 32 (see FIG. 7). If detection unit 32 detects the presence of human tissue in the reaction region 36, then an operating signal is transmitted to actuator unit 38, which stops drive unit 16 on the basis of this operating signal. Reaction area 36 corresponds to a subarea of machine tool work area 34, which is situated in the working direction 24 in front of tool 12. In the example shown, detection unit 32 is situated in protective hood 22, in particular in the front region of protective hood 22 situated in the working direction 24 in front of tool 12. In an alternative development it is conceivable that detection unit 32 is situated on a splitting wedge, on a parallel stop and/or on a cantilever above saw bench 18.

Figure 3:
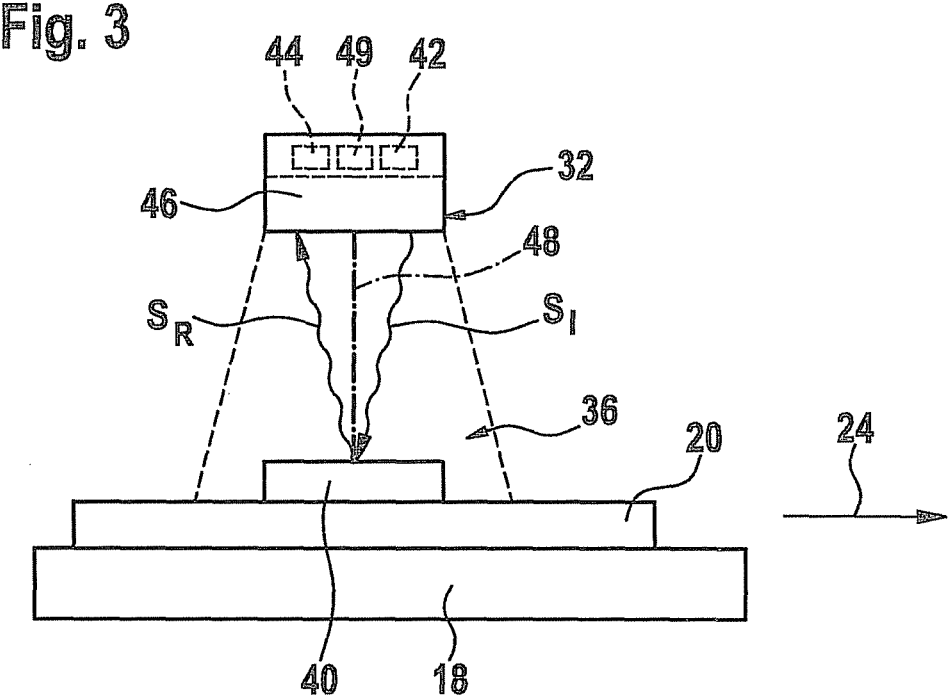
FIG. 3 shows a schematic representation of the detection unit having a transmitting unit for transmitting a radiation into the reaction area, a sensor unit and an object of investigation.

The functional principle of detection unit 32 is described with reference to FIG. 3. Saw bench 18, workpiece 20 and detection unit 32 are represented in a schematic view. For the sake of clarity, the representation of tool 12 and protective hood 22 is omitted. An object of investigation 40 is situated on workpiece 20 in reaction area 36. This object of investigation 40 may be in particular hand 26. Detection unit 32 has a transmitting unit 42 depicted schematically in the figure, which in operation transmits a radiation $S_I$ into reaction area 36. This radiation $S_I$ is reflected on object of investigation 40 and is received as radiation $S_R$ by a sensor unit 44 of detection unit 32 depicted schematically in the figure. An optical unit 46 is connected in front of transmitting unit 42 and sensor unit 44. Optical unit 46 has a lens unit (not shown), which defines the boundaries of the reaction area 36 into which radiation $S_I$ is transmitted. The lens unit is furthermore designed to limit the sensitivity of sensor unit 44 to radiation $S_R$ reflected in reaction area 36. Optical unit 46 has an optical axis 48. Machine tool monitoring device 30 also has a marking unit 49, which is represented schematically in FIG. 3, and which marks reaction area 36 of detection unit 32 by a projection on saw bench 18 when detection unit 32 is in operation. Marking unit 49 may be developed as a laser marker for example. Alternatively or additionally, reaction region 36 may be marked by transmitting unit 42, which produces a radiation component in the visible range.

Figure 4:
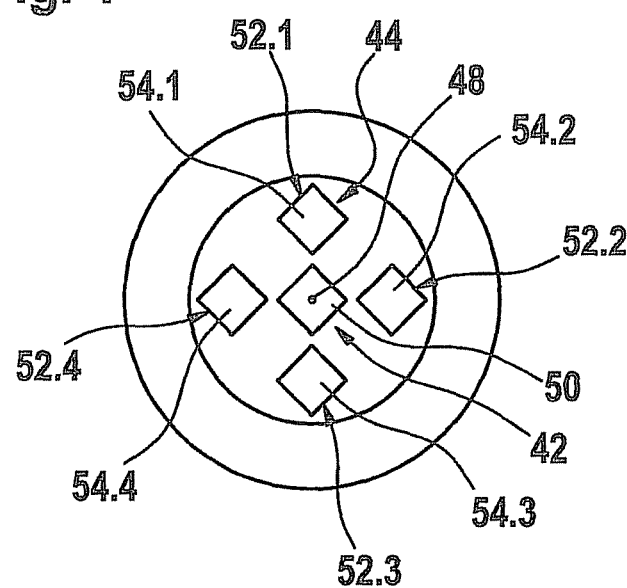
FIG. 4 shows a transmitting arrangement of the transmitting unit and a sensor arrangement of the sensor unit in a front view.

FIG. 4 show transmitting unit 42 and sensor unit 44 of detection unit 32 in a front view, in which optical axis 48 cuts through the plane of the drawing. Transmitting unit 42 has a transmitting arrangement 50 in the form of an LED. Four sensor arrangements 52 of sensor unit 44, each in the form of a photodiode, are situated in the direct surroundings of transmitting arrangement 50.

Figure 5:
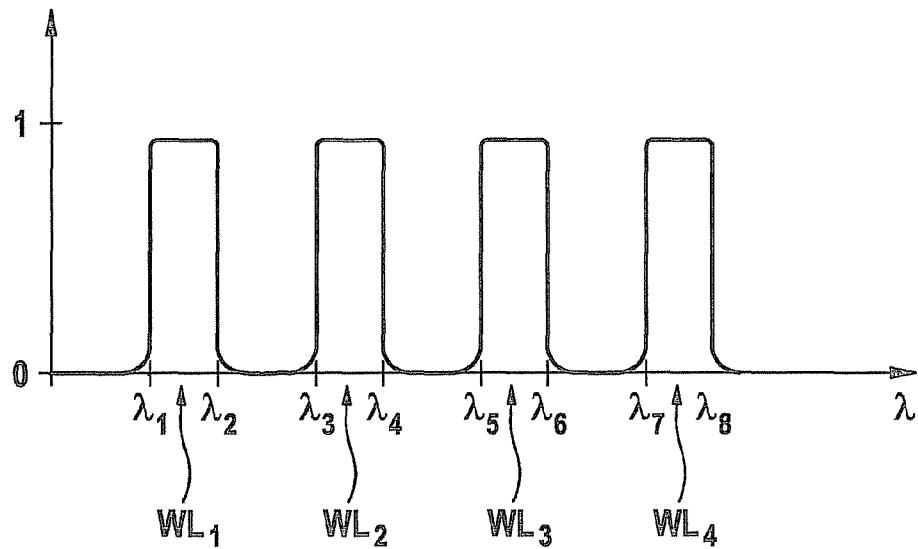
FIG. 5 shows the curve of the transmission factor of the sensor unit as a function of the wavelength.

Sensor arrangements 52 each have one sensitivity region 54, which is designed to detect radiation respectively in a different wavelength range $WL_1=[\lambda_1, \lambda_2]$, $WL_2=[\lambda_3, \lambda_4]$, $WL_3=[\lambda_5, \lambda_6]$ and $WL_4=[\lambda_7, \lambda_8]$. This is depicted schematically in FIG. 5. FIG. 5 shows the curve of the passage factor of sensor unit 44 as a function of wavelength $\lambda$ of reflection radiation $S_R$ received by sensor unit 44. Wavelength ranges $WL_i$ have, by way of example, a central wavelength of 630 nm, 700 nm, 980 nm, 1,050 nm and 1,200 nm and are developed in narrow-band fashion having respectively a bandwidth of approx. 10 nm. For a narrow-band filtering of detected radiation $S_R$, sensor unit 44 may be equipped, in addition to sensor arrangement 52, with a system of filter components that are connected in front of sensor arrangement 52. In the embodiment of sensor arrangement 52 as selective photodiodes, a narrow-band filtering is inherent in the system, which advantageously eliminates additional filter components. Alternatively or additionally to the photodiodes, sensor arrangement 52 may take the form of CCD or CMOS fields, InGaAs detectors, pyroelectric detectors etc.

Wavelength ranges $WL_2$, $WL_3$, $WL_4$ are situated in the infrared spectrum. In particular, these wavelength ranges $WL_2$, $WL_3$, $WL_4$ are respectively a range of the near infrared spectrum IR-A having the boundary values [700 nm, 1400 nm]. Wavelength range $WL_1$ is at least partially situated in the visible range of the electromagnetic spectrum. Alternatively or additionally, wavelength ranges in the infrared ranges IR-B (1.4-3 μm) and IR-C (3-15 μm) may be selected. Transmitting unit 42 having a transmitting arrangement 50 generates a radiation that comprises the wavelength ranges $WL_i$ shown in FIG. 5.

Figure 6:
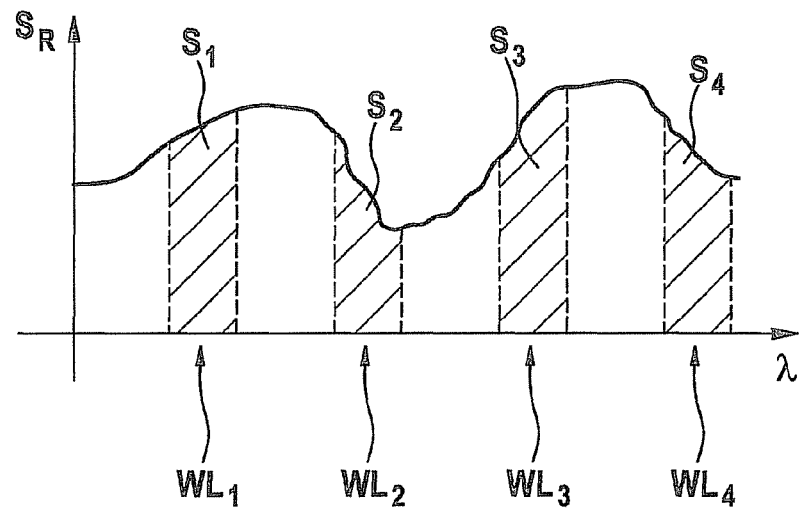
FIG. 6 shows the reflection spectrum of a radiation reflected on the reflection object as a function of the wavelength.

The principle of detecting the presence of human tissue in the reaction area 36 of detection unit 32 is explained with reference to FIGS. 6, 7 and 8. FIG. 6 shows the reflection spectrum of radiation $S_R$ reflected on object of investigation 40 and detected by sensor arrangement 52. This reflection spectrum corresponds to the distribution of the signal intensity as a function of wavelength $\lambda$ of radiation $S_R$. Sensor arrangement 52 or sensitivity regions 54 respectively detect a portion of the reflection spectrum in the corresponding wavelength ranges $WL_i$. Sensor arrangement 52 generate at their output terminals respectively a characteristic quantity of radiation $V_i$, which respectively takes the form of an electrical voltage. The characteristic quantity of radiation $V_1$ for example is proportional to the signal intensity $s_1$ of radiation $S_R$ integrated over wavelength range $WL_1$ and shaded in FIG. 6.

As may be gathered from FIG. 7, characteristic quantities of radiation $V_i$ are applied to an input of an analysis arrangement 58 of detection unit 32. In another variant it is conceivable that characteristic quantities of radiation $V_i$ are amplified. In an analysis, the characteristic quantities of radiation $V_i$ are compared by way of logical operations to values of a database 62 stored in a memory unit 60 of detection unit 32. This database is shown schematically in FIG. 8. In a first analysis strategy, the detected characteristic quantities of radiation $V_i$ are compared to stored values $A_1$, $A_2$, $A_3$ etc. Each pair $(V_i, A_i)$ is assigned a detection variable, which may assume the values "false" (F) or "true" (T). In the case of the value "F", a presence of human tissue in reaction area 36 is excluded. In a second, alternative or additional analysis strategy, analysis arrangement 58 ascertains ratios $V_1/V_2$; $V_1/V_3$ etc. between the different characteristic quantities of radiation $V_i$. These ratios are compared to stored values $A_1$, $A_2$, $A_3$ etc., on the basis of which, as described above, it is possible to infer the presence of human tissue in reaction area 36. The formation of ratios makes it possible to perform a detection that is independent of intensity. In addition, information may be stored in memory unit 60 about the spectral sensitivity of sensor arrangement 52, which may be drawn upon for analyzing the characteristic quantities of radiation $V_i$.

Detection unit 32 described here is an analog detection unit, in which the reflected radiation $S_R$ is detected and analyzed exclusively in analog fashion. In this case, it is possible to achieve a particularly effective detection on the basis of short detection and analysis times. A combined use of analog and digital signal processing arrangement or the exclusive use of digital signal processing arrangement is likewise conceivable.

Figure 9:
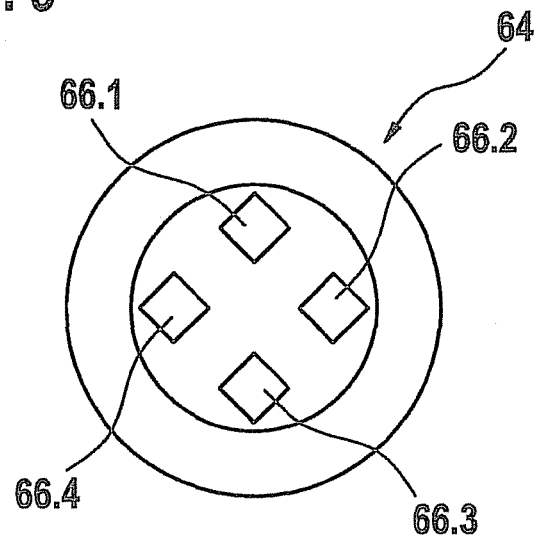
FIG. 9 shows an alternative transmitting unit of the detection unit for generating pulses.
Figure 10:
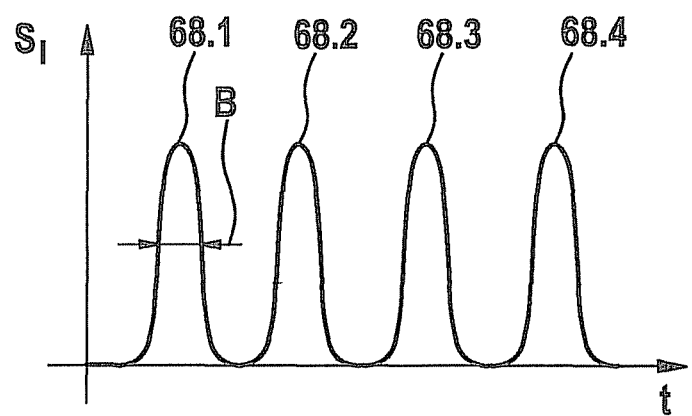
FIG. 10 shows the intensity of a radiation generated by the transmitting unit from FIG. 9.

Transmitting arrangement 50 transmits a radiation having a radiation intensity that is constant over time. In an alternative embodiment variant, detection unit 32 has an alternative transmitting unit 64, which transmits a radiation having a variable intensity into reaction area 36. This is shown in FIGS. 9 and 10. FIG. 9 shows sensor unit 64, which produces a radiation $S_I$, which has a series of pulses 68 and is shown in FIG. 10. FIG. 10 shows the curve of the intensity of radiation $S_I$ as a function of time t. One pulse 68 has a width B of approx. 100 μs. Transmitting unit 64 is designed to transmit a radiation successively in wavelength ranges $WL_1$ through $WL_4$. In this instance, in a series of four successive pulses 68.1 through 68.4, the pulses are respectively assigned to a different wavelength range $WL_1$ through $WL_4$. Pulses 68 correspond to a radiation that is transmitted in a respectively different wavelength range $WL_i$. For this purpose, transmitting unit 64 has a plurality of transmitting arrangement 66.1 through 66.4, which are respectively designed to transmit in a different wavelength range $WL_1$ through $WL_4$. In this instance, a transmitting arrangement 66.1 for pulse 68.1 corresponds to wavelength range $WL_1$ etc. Transmitting arrangement 66 may be respectively developed as LED for example. Such a successive radiation in different wavelength ranges $WL_i$ makes it possible to dispense with an elaborate filtering of the detected reflected radiation $S_R$.

What is claimed is:

1. A machine tool monitoring device, comprising:
   a sensor unit;
   a detection unit to detect a presence of a material type in a machine tool work area by spectral analysis of a radiation; and
   an evaluation arrangement in the detection unit configured to detect the presence of the material type based on a ratio of at least two measured intensities of radiation, which are respectively associated with a radiation component in a different wavelength range;
   wherein the detection unit has the sensor unit, and the sensor unit has a plurality of sensitivity regions for measuring intensities of radiation at different wavelengths including at least one first sensitivity region for detecting radiation in a first wavelength range that is situated at least partially in the infrared spectrum and at least one second sensitivity region for detecting radiation in a second wavelength range.

2. The machine tool monitoring device of claim 1, wherein the detection unit is configured to detect the presence of a material type by analyzing a reflection spectrum of a radiation reflected on an object of investigation.

3. The machine tool monitoring device of claim 1, wherein at least one of the wavelength ranges is a near-medium infrared range.

4. The machine tool monitoring device of claim 1, wherein the detection unit includes a transmitting unit, which is configured to transmit a radiation having at least one radiation component in at least one of the wavelength ranges.

5. The machine tool monitoring device of claim 4, wherein the transmitting unit is configured to transmit a radiation successively in the first wavelength range and in at least one additional wavelength range.

6. The machine tool monitoring device of claim 1, further comprising:
an optical unit to define a reaction area of the detection unit.

7. The machine tool monitoring device of claim 1, wherein at least one of the wavelength ranges is in a narrow-band fashion.

8. The machine tool monitoring device of claim 1, further comprising:
at least three sensitivity regions in the sensor unit, each detecting radiation in a different subrange of the wavelength range and each generating at an output terminal a characteristic quantity of radiation (Vi) proportional to a signal intensity of detected radiation over its respective wavelength subrange; and
logic to compare the generated characteristic quantity of radiation ($V_i$) at the output terminal of each sensitivity region to a plurality of stored radiation values ($A_i$), assign a true or false value to a detection variable for each pair of values ($V_i$, $A_i$), and infer a presence of human tissue from the assigned values to the detection variable for each value pair ($V_i$, $A_i$).

9. The machine tool monitoring device of claim 8, wherein the evaluation arrangement is configured to ascertain ratios between different characteristic quantities of radiation ($V_i$).

10. A cutting machine tool, comprising:
a machine tool monitoring device, including:
a sensor unit;
a detection unit to detect a presence of a material type in a machine tool work area by spectral analysis of a radiation; and
an evaluation arrangement in the detection unit configured to detect the presence of the material type based on a ratio of at least two measured intensities of radiation, which are respectively associated with a radiation component in a different wavelength range;
wherein the detection unit has the sensor unit, and the sensor unit has a plurality of sensitivity regions for measuring intensities of radiation at different wavelengths including at least one first sensitivity region for detecting radiation in a first wavelength range that is situated at least partially in the infrared spectrum and at least one second sensitivity region for detecting radiation in a second wavelength range.

* * * * *

UNITED STATES PATENT AND TRADEMARK OFFICE
CERTIFICATE OF CORRECTION

PATENT NO.        : 8,474,356 B2  
APPLICATION NO. : 12/664596  
DATED             : July 2, 2013  
INVENTOR(S)       : Stellmann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this  
Eighth Day of September, 2015

Michelle K. Lee  
*Director of the United States Patent and Trademark Office*